A. J. KLONECK.
GENERATING SYSTEM FOR ELECTRIC CURRENTS.
APPLICATION FILED MAR. 27, 1916.
1,374,170.
Patented Apr. 5, 1921.
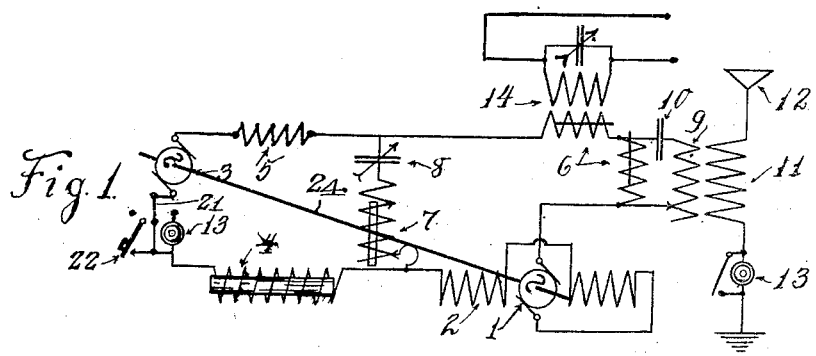
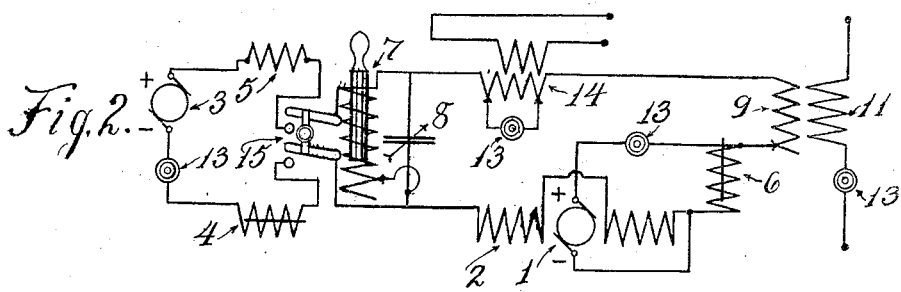
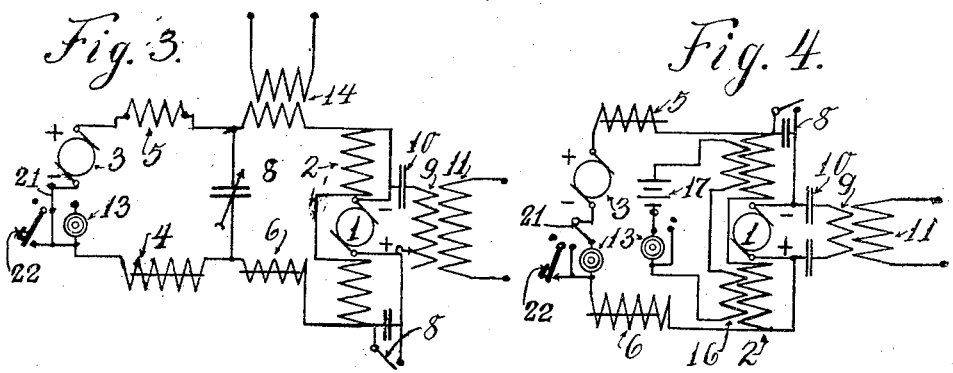
WITNESSES.
Martin Poppelauer.
Norbert Landau.
INVENTOR.
August J. Kloneck.

UNITED STATES PATENT OFFICE.

AUGUST J. KLONECK, OF NEW YORK, N. Y.

GENERATING SYSTEM FOR ELECTRIC CURRENTS.

1,374,170. Specification of Letters Patent. Patented Apr. 5, 1921.

Application filed March 27, 1916. Serial No. 86,963.

*To all whom it may concern:*

Be it known that I, AUGUST J. KLONECK, a citizen of the United States, and a resident of New York, in the county of New York and State of New York, have invented new and useful Improvements in Generating Systems for Electric Currents, of which the following is a specification.

This invention relates to systems and apparatus for generating high frequency electrical currents.

One object of the invention is to provide an arrangement of electric circuits and elements to generate electrical oscillations of high frequency.

Another object of the invention is to provide suitable electric circuits and apparatus to vary the frequency of an oscillating current.

A still further object of this invention is to provide suitable circuits and apparatus for utilizing the generated oscillating current from the apparatus.

Like parts are represented by similar characters of reference throughout the specification and in the drawings in which:

Figure 1 is a diagrammatic view, showing a series dynamo in combination with electric circuits and elements for this purpose. Fig. 2 is a diagrammatic view of a modified arrangement of electric circuits and apparatus. Fig. 3 shows a diagrammatic view of electric circuits and elements in combination with a shunted field dynamo generator. Fig. 4 is a diagrammatic view of a modified arrangement of electric circuits and apparatus.

In Fig. 1, 1 represents an armature and 2 the field of a dynamo, having low inductance and preferably a laminated field and armature. The connections between field 2 and armature 1 are reversed so that the armature will not generate a current or excite its field 2. The numeral 3 represents another current generator, a dynamo, battery or any suitable source of electrical current. However, the current from both generators is assumed alike, either direct current or alternating current and if the latter, means are provided, such as direct coupling 24 to synchronize both dynamos. 4 is an impedance coil, having higher resistance and impedance than field 2 if the tension of the electric current of generator 3 is equal or higher than that of armature 1. 5 and 6 are other impedances, resistance or inductance coils, the use of one or the other being determined by experiment, depending upon the frequency of the current to be produced. 7 is an inductance and 8 a condenser. An oscillation circuit comprising an inductance 9 and a condenser 10 may be employed or omitted, as desired and a secondary 11 or another suitable arrangement serves to utilize the generated current for any desired purpose, as for instance for electric radiation by an antenna 12. A transmitting device which may be a switch 21, a telegraph key 22, or a telephone transmitter 13 is inserted in any of the circuits, as convenient or desired. Instead of the radiating circuit at 11, I may employ any other part of the circuit for utilizing a generated current, as a transformer at 14 for instance.

In Fig. 2, I have shown the generator 3 omitted in the continuous operation of generator 1, however, it may be used for starting a current generation of generator 1 or to vary the current by a transmitting instrument 13. An inductance coil 7 serves to complete the circuit of armature 1 and field 2 of the generator. I have further indicated a transmitter 13 at various points of the circuit for modifying a current according to a desired purpose.

In Fig. 3, the armature 1 is connected in series to generator 3, but in multiple to its own field 2, whereby the latter is acted upon by the opposing currents from 1 and 3 alternately. Suitable choke coils, and impedances 5 and 6 or condensers 8 prevent a detrimental rise of the current between the short circuiting generators 1 and 3.

In Fig. 4, the field 2 of the generator will be controlled by an additional coil 16, which is connected to a battery 17 and a transmitting instrument 13, permitting a variation of the generated currents as convenient or desired.

The operation of the device is as follows: The armature 1 of the dynamo generates a current which is opposed to its field magnetism, for the reason, that if the connections between field and armature of a common direct current dynamo, for instance are reversed, it will not be able to build up a current. For the purpose of generating a current in armature 1, I employ another source of current as that of generator 3. Thence an increasing current in armature 1 diminishes its field magnetism, for the reason that it is opposed to current from generator 3 which created it. Further, the inductances and condensers in the circuit or associated thereto reacts upon the same, preventing an equalizing generating of current by armature 1 and generator 3 upon the field and thus, a continuously oscillating current is produced in said circuits. It will be noted that currents of different character will be produced at different parts of the circuit, according to the fluctuation of the current. While at 4 and 5 it may slightly fluctuate, it will have wave character of positive or negative value at 6 and nearby and also in the field, or the current may completely alternate at 9.

Having fully described my invention, that which I claim as new and desire to protect by Letters Patent is:

1. A system for generating high frequency currents comprising a dynamo generator, a source of electrical current and suitable reactances in an electric circuit, said dynamo generator having the field reversed to be inoperative by an armature current of said generator but operative by a current from a source of electrical current, a means for utilizing the resultant current and means for varying the generating of currents for a desired purpose.

2. A system for generating high frequency currents, comprising a dynamo and means for energizing the field of the same, said dynamo having its field magnetism neutralized through a generated current of its armature which armature current itself vanishes thereby, inductances and reactances and electric circuits coöperating therewith serving to be loaded by the armature currents and reënergizing the field thereafter, and means for modifying and utilizing the generated currents.

3. A generator for oscillating currents, embracing a dynamo having field and armature connected with each other in a manner whereby armature currents will neutralize the field magnetism to zero, a source of electrical current normally energizing the field in circuits including impedances and reactances, means for modifying and interrupting the currents, and means for utilizing said oscillating currents, associated with said circuits.

4. A generator for oscillating currents, embracing two dynamos in circuit with one another and with impedances and current modifying means, one dynamo having its field coils and suitable impedances in series with the other as a charging dynamo for normally energizing said field coils of the first dynamo, the armature currents generated by the first dynamo serving to change its field magnetism oppositely to that of the charging dynamo and to operate in the reversed direction upon desirable impedances and utilizing means.

5. In a generator for oscillating currents, the combination of circuits and elements embracing impedances, reactances, a current generator and a dynamo generator having armature and field in shunt circuits with respect to one another and said elements, the current of the current generator and the current generated by the armature of said dynamo generator operating against one another upon the field of said dynamo and certain of said elements, the current generator energizing the field of said dynamo, the armature current neutralizing its field energization and reversing the flow of current for certain of said elements, the armature of said dynamo generator thence discontinuing to generate currents for a period, whereupon said current generator and the elements reënergize the field and the armature of said dynamo generator, said circuits including elements for utilizing said generated currents.

6. A generator for high frequency currents, embracing impedances, operating means and a dynamo, having field and armature, the field and armature of which are reversedly connected with one another, the armature currents serving to destroy its field magnetism, and reverse certain operating means, and another generator for electric currents, serving to energize the field of said first dynamo generator and said impedances and operating means.

7. A generator for high frequency currents, embracing impedances, operating means and a dynamo generator, having field and armature, the field and armature of which are reversedly connected with one another, the armature currents serving to destroy its field magnetism, and reverse certain operating means, and another generator for electric current, serving to energize the field of said dynamo generator and said impedances and operating means, and impedances interposed between the terminals of said two generators.

8. A generator for high frequency currents, embracing impedances, operating means and a dynamo generator, having field and armature, the field and armature of which are reversedly connected with one another, the armature currents serving to destroy its field magnetism, and reverse certain operating means, and another generator for electric current, serving to energize the field of said dynamo generator and said impedances and operating means, and impedances interposed between the terminals of said second current generator and the field and armature of said first dynamo generator.

9. In a generator for oscillating currents, the combination of circuits and elements embracing modifying and utilizing means, impedances and reactances, including current generators, an operating generator having energizing coils and an armature, an exciting generator and a modifying generator adapted for energizing said coils of the first generator and by the latter said armature, and said elements, said armature serving for sending an opposing current through its energizing coils with respect to said exciting generator for neutralizing the energization of said coils and reversing a flow of current for a part of said elements, and thereby neutralizing itself, whereupon said exciting current generator repeats its action on said energizing coils and elements.

10. A generator for alternating currents comprising two dynamos and circuits including operating and modifying means, one dynamo being adapted for energizing the field of the second dynamo, said second dynamo being adapted for periodically generating current against its field and in the opposing direction with respect to said first dynamo for neutralizing its field and itself, permitting a reënergization of its field by said first dynamo and a repetition of such actions at a frequency, as desired.

11. In a generator for alternating currents the combination of circuits including a plurality of current generators, of operating and modifying elements, one current generator exciting the field of a second current generator, said second current generator having said field in circuit with its armature for neutralizing one another by generated armature currents, permitting a reënergization of its field by said first generator alternately, and a circuit including separate field coils of said second generator and current modifying means, and current generating means for energizing the field coils of said second generator.

12. In a generator of the type set forth, a system of generating alternating currents by two dynamos, of which one dynamo energizes itself and the field of the second dynamo while the second dynamo neutralizes its field and itself by periodically generated armature currents in a direction opposite to said periodically energizing field current of said first mentioned dynamo and alternately reverses a current flow of said dynamos for utilizing circuits and elements.

In testimony whereof I hereunto subscribe my name to this specification in the presence of two witnesses.

AUGUST J. KLONECK.

Witnesses:
MARTIN POPPELAUER,
NORBERT LANDAU.